United States Patent
Clerckx et al.

(10) Patent No.: US 8,599,751 B2
(45) Date of Patent: Dec. 3, 2013

(54) CLUSTERED MULTI-CELL MULTI-USER MULTIPLE INPUT MULTIPLE OUTPUT COMMUNICATION SYSTEM USING CELL-EDGE USER SELECTION SCHEME

(75) Inventors: Bruno Clerckx, Seoul (KR); Ki Il Kim, Yongin-si (KR); Junil Choi, Seoul (KR); David J. Love, West Lafayette, IN (US); Tae Joon Kim, West Lafayette, IN (US); Chun Kin Au-Yeung, West Lafayette (IN); Obadamilola Aluko, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 471 days.

(21) Appl. No.: 12/880,192

(22) Filed: Sep. 13, 2010

(65) Prior Publication Data

US 2011/0064051 A1  Mar. 17, 2011

Related U.S. Application Data

(60) Provisional application No. 61/241,993, filed on Sep. 14, 2009.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 7,558,577 B2 * | 7/2009 | Dillon et al. ................... | 455/443 |
| 2002/0042276 A1 | 4/2002 | Hakalin et al. | |
| 2005/0037771 A1 * | 2/2005 | Tiedemann et al. ........... | 455/453 |
| 2005/0059408 A1 * | 3/2005 | Tiedemann et al. ........ | 455/452.1 |
| 2006/0116171 A1 * | 6/2006 | Tiedemann et al. ........... | 455/561 |
| 2007/0093254 A1 * | 4/2007 | Tiedemann et al. ........... | 455/453 |
| 2007/0105559 A1 * | 5/2007 | Dillon et al. ................... | 455/443 |
| 2007/0155377 A1 * | 7/2007 | Horiguchi et al. .......... | 455/422.1 |
| 2008/0004033 A1 * | 1/2008 | Tiedemann et al. ........... | 455/453 |
| 2009/0042512 A1 * | 2/2009 | Haseba et al. ................ | 455/63.1 |
| 2010/0081448 A1 * | 4/2010 | Wong et al. ................. | 455/452.1 |
| 2010/0113059 A1 * | 5/2010 | Morimoto et al. .......... | 455/452.2 |
| 2010/0159936 A1 * | 6/2010 | Brisebois et al. ............. | 455/450 |
| 2010/0197314 A1 * | 8/2010 | Maaref et al. ................. | 455/450 |
| 2011/0034192 A1 * | 2/2011 | Lim et al. ...................... | 455/501 |
| 2011/0195732 A1 * | 8/2011 | Kim et al. ...................... | 455/509 |

FOREIGN PATENT DOCUMENTS

| | | |
|---|---|---|
| JP | 2000-324529 | 11/2000 |
| JP | 2006-211129 | 8/2006 |
| KR | 10-2005-0020720 | 3/2005 |
| KR | 10-2005-0106656 | 11/2005 |
| KR | 10-2006-0097497 | 9/2006 |
| KR | 10-2007-0025757 | 3/2007 |

* cited by examiner

*Primary Examiner* — Bob Phunkulh
(74) *Attorney, Agent, or Firm* — NSIP Law

(57) ABSTRACT

Provided is a control method of a control apparatus for a multi-cell communication system including a plurality of cells, the method including determining a cell edge terminal or an inner cell terminal from each of terminals included in each of the cells, and selecting, from base stations included in the plurality of cells, a first base station and a second base station. The first base station may serve all of a corresponding cell edge terminal and a corresponding inner cell terminal, and the second base station may serve only the corresponding inner cell terminal between the corresponding cell edge terminal and the corresponding inner cell terminal.

9 Claims, 10 Drawing Sheets

CLUSTERED MULTI-CELL MULTI-USER MULTIPLE INPUT MULTIPLE OUTPUT COMMUNICATION SYSTEM USING CELL-EDGE USER SELECTION SCHEME

CROSS-REFERENCE TO RELATED APPLICATION(S)

This application claims the benefit under 35 U.S.C. §119(e) of a U.S. Provisional Application No. 61/241,993, filed on Sep. 14, 2009, in the U.S. Patent and Trade Mark Office, the entire disclosures of which are incorporated herein by reference for all purposes.

BACKGROUND

1. Field

The following description relates to a multi-cell multi-user multiple input multiple output (MIMO) communication system, and more particularly, to technology for enhancing an overall throughput of a communication system when inter-cell interference exists.

2. Description of Related Art

A multiple input multiple output (MIMO) communication system may enhance an overall throughput by effectively using spatial resources. The MIMO communication system may achieve a high throughput through spatial multiplexing.

The MIMO communication system may be classified into a single-user MIMO communication system and a multi-user MIMO communication system, based on a number of terminals being served. The MIMO communication system may also be classified into a single-cell MIMO communication system and a multi-cell MIMO communication system, based on a number of cells.

The following embodiments relate to a multi-cell multi-user MIMO communication system.

SUMMARY

In one general aspect, a control method of a control apparatus for a multi-cell communication system including a plurality of cells, includes determining a cell edge terminal or an inner cell terminal from each of terminals included in each of the cells, and selecting, from base stations included in the plurality of cells, a first base station and a second base station, the first base station serving all of a corresponding cell edge terminal and a corresponding inner cell terminal, and the second base station serving only the corresponding inner cell terminal between the corresponding cell edge terminal and the corresponding inner cell terminal.

While the first base station serves all of the corresponding cell edge terminal and the corresponding inner cell terminal, the second base station may serve the corresponding inner cell terminal.

The method may further include calculating a sum rate of cell edge terminals in each of the cells. The selecting may include selecting the first base station and the second base station in each of the cells, based on the sum rate.

The method may further include selecting one cell from the plurality of cells maximizing a sum rate of corresponding cell edge terminals in each of the cells. The selecting may include selecting, as the first base station, a base station included in the selected cell, and selecting, as the second base station, a base station included in at least one remaining cell.

The method may further include obtaining, from each of the terminals included in each of the cells, quantized index information with respect to each of channels to the base stations and information associated with a norm of each of the channels. The selecting may include selecting the first base station and the second base station based on the quantized index information and information associated with the norm of each of the channels.

The determining may include determining the cell edge terminal or the inner cell terminal based on a distance between each of the terminals included in each of the cells and a corresponding serving base station, or a distance between each of the terminals included in each of the cells and a corresponding interference base station.

The determining may include determining the cell edge terminal or the inner cell terminal based on a strength of interference occurring in each of the terminals included in each of the cells or channel quality information in each of the terminals.

The method may further include providing information associated with the selection result to the base stations included in the plurality of cells.

In another general aspect, a communication method of a target base station included in one target cell among a plurality of cells included in a multi-cell communication system, includes providing, to a control apparatus of the multi-cell communication system, quantized index information associated with each of channels from each of terminals included in the target cell to base stations included in the plurality of cells and information associated with a norm of each of the channels, receiving information associated with a selection result when the control apparatus selects, from base stations included in the plurality of cells, a first base station and a second base station, the first base station serving all of a corresponding cell edge terminal and a corresponding inner cell terminal, and the second base station serving only the corresponding inner cell terminal between the corresponding cell edge terminal and the corresponding inner cell terminal, and serving at least one of a cell edge terminal and an inner cell terminal included in the target cell depending on whether the target base station corresponds to the first base station or the second base station.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
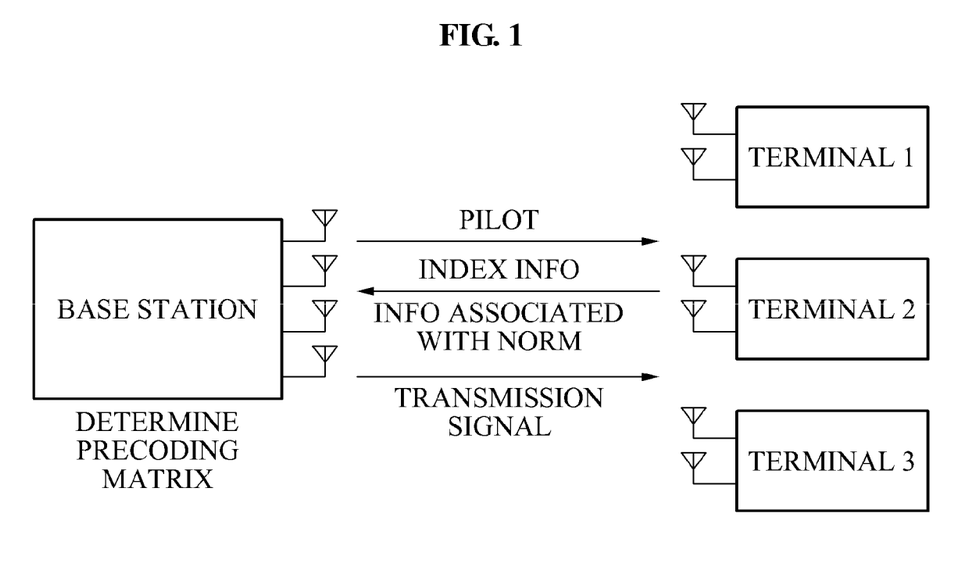
FIG. 1 is a diagram illustrating an example of a single-cell multi-user multiple input multiple output (MIMO) communication system.

FIG. 1 illustrates an example of a single-cell multi-user multiple input multiple output (MIMO) communication system.

Referring to FIG. 1, the single-cell multi-user MIMO communication system may include a base station and a plurality of terminals 1, 2, and 3.

The base station may transmit a well-known signal to the terminals 1, 2, and 3. Each of the terminals 1, 2, and 3 may estimate a channel from the base station to each of the terminals 1, 2, and 3 using a pilot.

A codebook including a plurality of codewords may be pre-stored in each of the base station and the terminals 1, 2, and 3. Each of the codewords may have a quantized index. For example, a 3-bit codebook may have eight codewords and each of the eight codewords may have a quantized index.

Each of the terminals 1, 2, and 3 may select, from the codewords based on the estimated channel, a codeword most appropriate for a corresponding channel. The selected codeword may be referred to as a preferred codeword. Each of the terminals 1, 2, and 3 may feed back, to the base station, quantized index information of the selected codeword. The quantized index information fed back by each of the terminals 1, 2, and 3 may be referred to as a precoding matrix indicator (PMI), channel direction information, and the like.

Each of the terminals 1, 2, and 3 may feed back, to the base station, channel quality information indicating a quality of a corresponding channel. The channel quality information may include information associated with a norm of the corresponding channel.

The base station may select at least one terminal from the terminals 1, 2, and 3, based on the quantized index information and the channel quality information fed back from each of the terminals 1, 2, and 3. The base station may determine a precoding matrix for the selected at least one terminal, and may generate a transmission signal using the precoding matrix. The transmission signal may be transmitted to the terminals 1, 2, and 3 via a plurality of antennas installed in the base station.

Even though a case where the base station may adaptively determine a rank is not described above, each of the terminals 1, 2, and 3 may feed back a preferred rank to the base station. The base station may adaptively determine the rank based on the fed back preferred rank.

Figure 2:
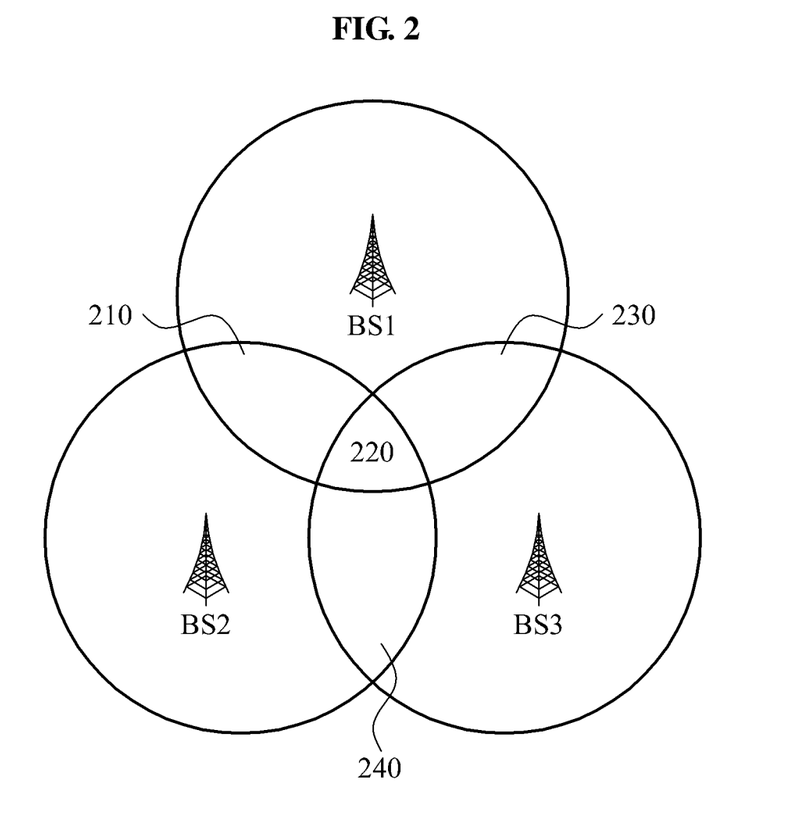
FIG. 2 is a diagram illustrating an example of a multi-cell multi-user MIMO communication system.

FIG. 2 illustrates an example of a multi-cell multi-user MIMO communication system.

Referring to FIG. 2, the multi-cell multi-user MIMO communication system may include a plurality of cells. The plurality of cells may include a base station 1 (BS1), a base station 2 (BS2), and a base station 3 (BS3).

Inter-cell interference may occur in the multi-cell multi-user MIMO communication system, which is different from a single-cell multi-user MIMO communication system. For example, a terminal served by the BS1 may receive a desired signal from the BS1 and receive interference signals from the BS2 and the BS3. Relatively great inter-cell interference may occur in an edge of each of the cells. For example, when a terminal is present around cell edges 210, 220, 230, and 240, relatively great inter-cell interference may occur in the terminal. The inter-cell interference may decrease a throughput of the terminal. The inter-cell interference may decrease an overall throughput of the multi-cell multi-user MIMO communication system.

Figure 3:
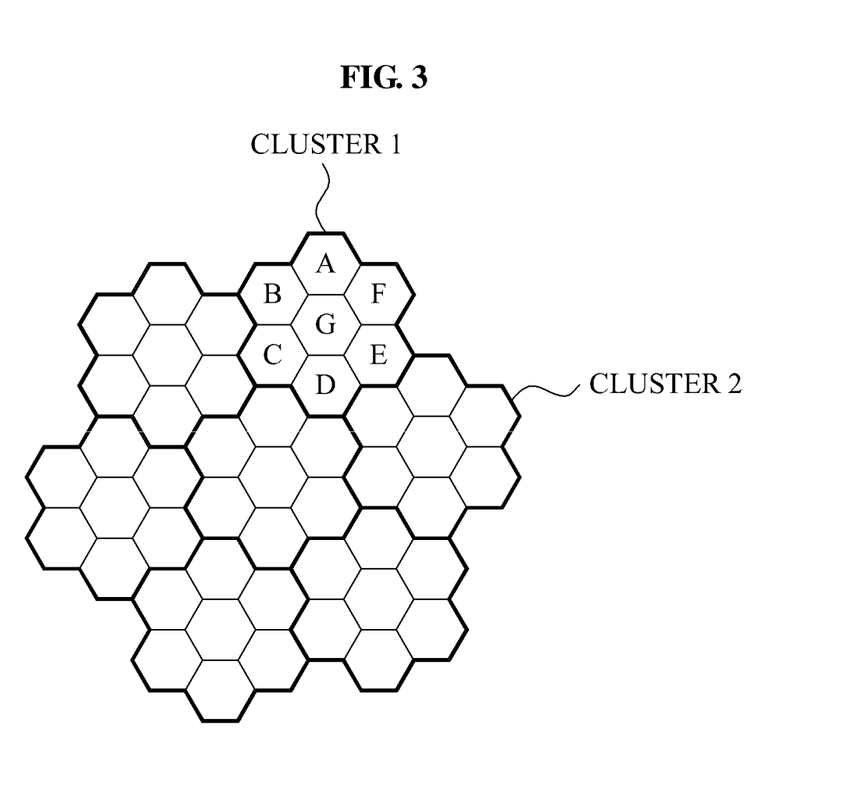
FIG. 3 is a diagram illustrating an example of clusters including a plurality of cells.

FIG. 3 illustrates clusters including a plurality of cells.

Referring to FIG. 3, $C_T$ cells may be clustered. For example, a plurality of clusters including cluster 1 and cluster 2 may be present. In FIG. 3, the cluster 1 includes cells A, B, C, D, E, F, and G, and each of the clusters may include $C_T=7$ cells.

Cells included in a single cluster may cooperate with each other to decrease inter-cell interference. A cooperation scheme of the cells within the single cluster will be described.

A number of cells included in the single cluster may be variously set, and may also be adjusted in real time based on a manager's selection. For example, the cluster 1 may include five cells and the cluster 2 may include eight cells.

Figure 4:
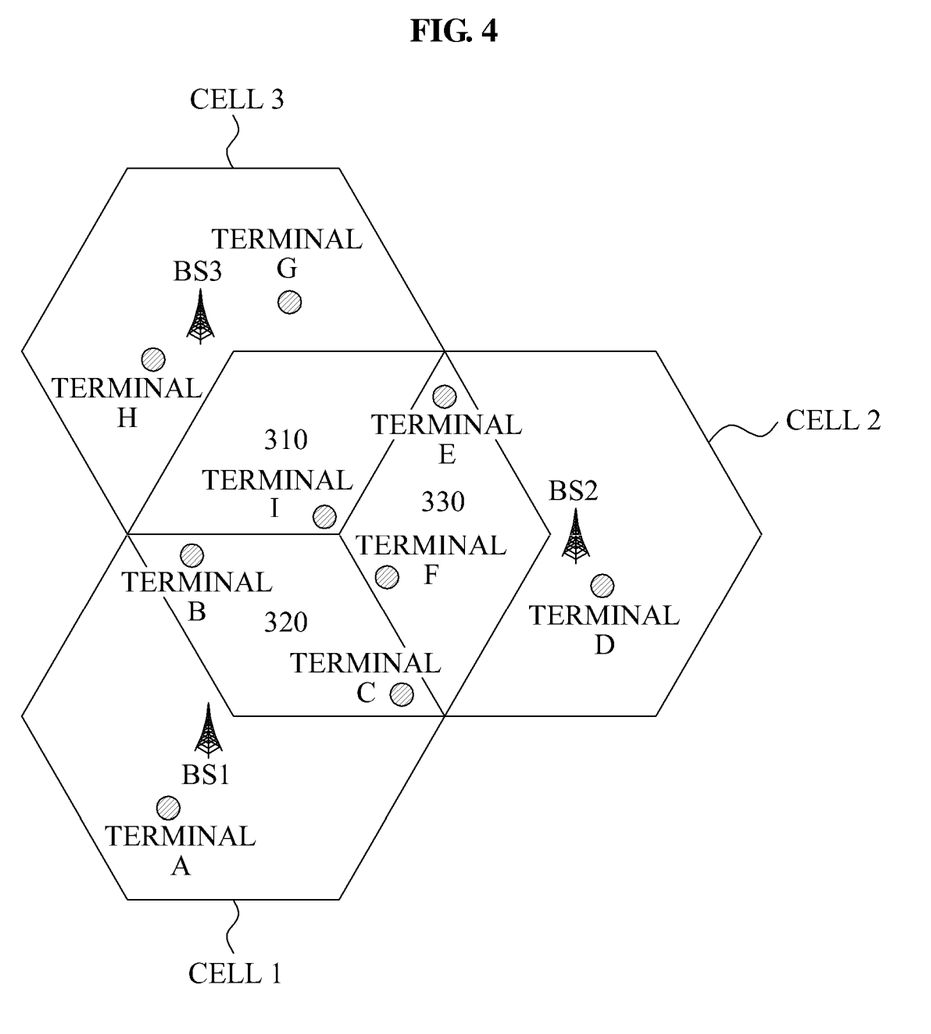
FIG. 4 is a diagram illustrating an example of base stations, cell edge terminals, and inner cell terminals included in a multi-cell MIMO communication system including a plurality of cells.

FIG. 4 illustrates an example of base stations, cell edge terminals, and inner cell terminals included in a multi-cell MIMO communication system including a plurality of cells.

Referring to FIG. 4, cells 1, 2, and 3 may be included in a single cluster. Each of the cells 1, 2, and 3 may include at least one inner cell terminal and at least one cell edge terminal. For example, the cell 1 may include BS1, may include a terminal A as an inner cell terminal, and may include terminals B and C as cell edge terminals. The cell 2 may include BS2, may include a terminal D as an inner cell terminal, and may include terminals E and F as cell edge terminals. The cell 3 may include BS3, may include terminals G and H as inner cell terminals, and may include a terminal I as a cell edge terminal. The cell edge terminals may indicate terminals present in areas 310, 320, and 330.

In a downlink, when the BS1, the BS2, and the BS3 simultaneously serve terminals present in corresponding cells using the same frequency resource, the terminals may experience interference. Here, when an index of each of terminals present in a cell k is $i_k$, a signal received in a terminal $i_k$ may be expressed by Equation 1.

$$y_{i_k} = \alpha_{i_k k} \sqrt{\frac{P_k}{N_T}} H_{i_k k} F_{i_k} s_{i_k} + \sum_{c=1}^{C_T} \alpha_{i_k c} \sqrt{\frac{P_c}{N_T}} \sum_{\substack{i_c=1 \\ i_c \neq i_k}}^{L_c} H_{i_k c} F_{i_c} s_{i_c} + n_{i_k}$$ [Equation 1]

In Equation 1, $\alpha_{i_k c}$ corresponds to a large-scale fading effect of pathloss and shadowing experienced by the terminal $i_k$ from a base station included in a cell c, $P_k$ corresponds to a total transmit power for the cell k, $H_{i_k c} \in \mathbb{C}^{N_R \times N_T}$ corresponds to a channel matrix having a small-scale fading effect experienced by the terminal $i_k$ from the base station included in the cell c. Entries of $H_{i_k,c}$ may be distributed as a complex Gaussian distribution CN(0, 1) with an average of 0 and a variance of 11, $D_{i_k}$ corresponds to a number of streams transmitted to the terminal $i_k$, and $F_{i_k} \in \mathbf{C}^{N_T \times D_{i_k}}$ corresponds to a linear precoding matrix for the terminal $i_k$. Also $S_{i_k} \in \mathbf{C}^{D_{i_k} \times 1}$ corresponds to a symbol vector transmitted, to the terminal $i_k$, from the base station included in the cell k and thus, $E[s^*_{i_k} S_{i_k}] \leq 1$, and $n_{i_k} \in \mathbf{C}^{N_R \times 1}$ corresponds to an additive white Gaussian noise (AWGN). $N_T$ corresponds to a number of antennas installed in the base station, $N_R$ corresponds to a number of antennas installed in each terminal, and $L_c$ corresponds to a number of terminals included in the cell c.

Here, it is assumed that a common codebook $\mathcal{F} = \{f_1, \ldots, f_J\}$ is stored in all the base stations included in all the cells. The codebook $\mathcal{F} = \{f_1, \ldots, f_J\}$ may include J codewords.

Since $C_T$ channels are formed between each terminal included in each cell and $C_T$ base stations, $C_T$ channel matrices may exist. Each channel may be quantized using the same codebook $\mathcal{F} = \{f_1, \ldots, f_J\}$ and thus, quantized index information of each of the channels may be $\log_2 J$. Specifically, each of the terminals may feed back $C_T \log_2 J$ bits of quantized index information to the base stations.

Each terminal may feed back channel quality information of each of the channels to at least one of the base stations. A number of bits of the channel quality information may be predetermined.

For concise description, it is assumed that a single antenna is installed in each terminal. A signal-to-interference and noise ratio (SINR) for the terminal $i_k$ may be represented by Equation 2.

$$SINR_{i_k} = \frac{\alpha_{i_k,k}^2 P_k |h_{i_k,k} f_{i_k}|_2^2}{1 + \sum_{c=1}^{C_T} \alpha_{i_k,c}^2 P_c \sum_{\substack{i_c=1 \\ i_c \neq i_k}}^{L_c} |h_{i_k,c} f_{i_c}|_2^2}.$$ [Equation 2]

Accordingly, a sum rate achievable by scheduled terminals included in the cell k may be given by Equation 3.

$$R_k = \sum_{i_k=1}^{L_k} \log(1 + SINR_{i_k}).$$ [Equation 3]

When all the base stations included in cells are managed by a single control apparatus, the control apparatus may obtain quantized index information and channel quality information from the base stations. For example, the terminal $i_k$ included in the cell k may feed back information associated with a channel formed between a base station included in the cell k and the terminal $i_k$, and information associated with channels formed between base stations included in other cells and the terminal $i_k$, for example, quantized index information and channel quality information. Accordingly, the sum rate achievable by the scheduled terminals included in the cell k may be calculated by the control apparatus. The terminal $i_k$ included in the cell k may generate quantized index information associated with the channels formed between the base stations included in the cells and the terminal $i_k$ as expressed by Equation 4.

$$j_{i_k,c} = \arg\max_{f_j \in F} |h_{i_k,c} f_j|^2$$ [Equation 4]

In Equation 4, $i_k = 1, \ldots, L_k$ and $c = 1 \ldots, C_T$.

Generally, interference may further increase in boundaries between cells. For example, referring to FIG. 4, interference may further occur in the areas 310, 320, and 330. The interference may greatly affect a sum rate of terminals in a communication system.

According to an embodiment, terminals may be grouped into inner cell terminals and edge cell terminals based on distances between a serving base station and the terminals, or interference occurring in the terminals. The inner cell terminals may be relatively closer to the serving base station, and the cell edge terminals may be relatively far away from the serving base station. Hereinafter, technology of increasing a sum rate by appropriately scheduling the cell edge terminals and the inner cell terminals will be described.

An overall sum rate may be defined as a sum rate of the cell edge terminals and a sum rate of the inner cell terminals. It may indicate that the overall sum rate may increase through a selection of a cell edge terminal.

$\mathcal{T}_{e_k}$ corresponds to a set including indices of all the scheduled cell edge terminals with respect to the cell k, and $\mathcal{T}_{in_k}$ corresponds to a set including indices of all the scheduled inner cell terminals with respect to the cell k.

When the terminals are assumed to generate the quantized index information according to Equation 4, a sum rate of the inner cell terminals may be expressed by Equation $$R_k^i = \sum_{i_k \in T_{in_k}} \log(1 + SINR_{i_k})$$ [Equation 5]

The sum rate of the cell edge terminals may be expressed by Equation 6.

$$R_k^e = \sum_{i_k \in T_{e_k}} \log(1 + SINR_{i_k}).$$ [Equation 6]

According to an embodiment, among all the base stations included in a single cluster, only a selected base station may serve cell edge terminals of the selected base station at a predetermined point in time. In particular, only a single base station or at least two selected base stations may serve its or their cell edge terminals. However, all the base stations may serve inner cell terminals. For example, in FIG. 4, when the BS1 is selected, the BS1 may serve all of the terminals B and C corresponding to cell edge terminals and the terminal A corresponding to an inner cell terminal at a predetermined point in time. The BS2 may serve only the terminal D and the BS3 may serve only the terminals G and H.

Since unselected cells may redistribute a total transmit power to inner cell terminals included in the unselected cells, inter-cell interference may further decrease in selected cell edge terminals.

A calculation used to select the cell edge terminals may be performed by the control apparatus. The control apparatus may be configured using various locations or devices within the communication system, which will be described with reference to FIG. 5 and FIG. 6.

Figure 5:
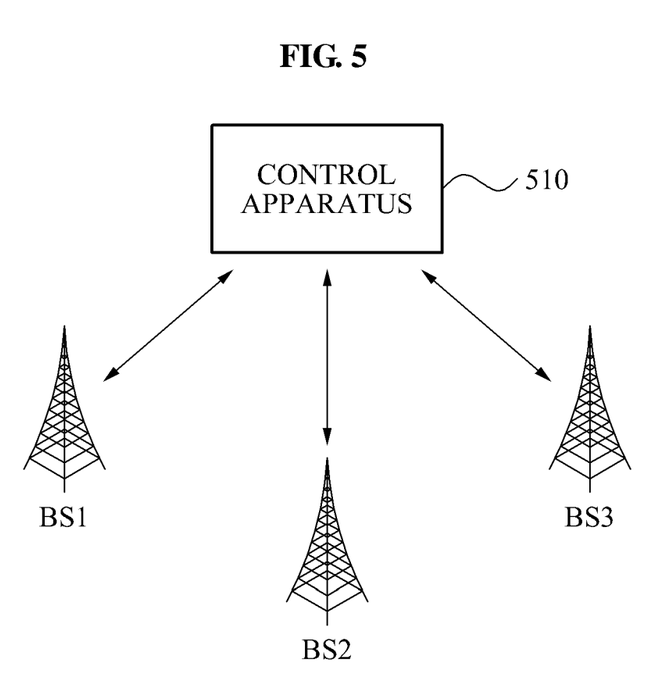
FIG. 5 is a diagram illustrating an example of a control apparatus installed separate from a plurality of base stations.

FIG. 5 illustrates an example of a control apparatus 510 installed separate from a plurality of base stations.

Referring to FIG. 5, the control apparatus 510 may be configured in an upper layer of BS1, BS2, and BS3 included in a single cluster. In this case, the BS1, the BS2, and the BS3 may report to the control apparatus 510 about quantized index information and channel quality information. The control apparatus 510 may select, from the BS1, the BS2, and the BS3, at least one base station that may service cell edge terminals at a particular point in time, and may provide information associated with the selection result to the BS1, the BS2, and the BS3.

Figure 6:
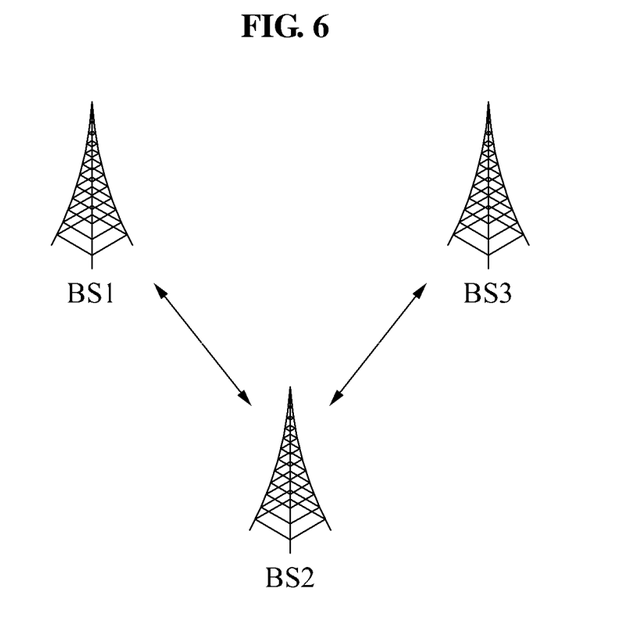
FIG. 6 is a diagram illustrating an example of a base station controlling other base stations.

FIG. 6 illustrates an example of BS2 controlling other base stations, that is, BS1 and BS3.

Referring to FIG. 6, a control apparatus may be configured within the BS2 among the BS1, the BS2, and the BS3. The BS1 and the BS3 may report to the control apparatus about quantized index information and channel quality information. The BS2 may select at least one base station that may serve cell edge terminals at a particular point in time and may provide information associated with the selection result to the BS1, the BS2, and the BS3.

Figure 7:
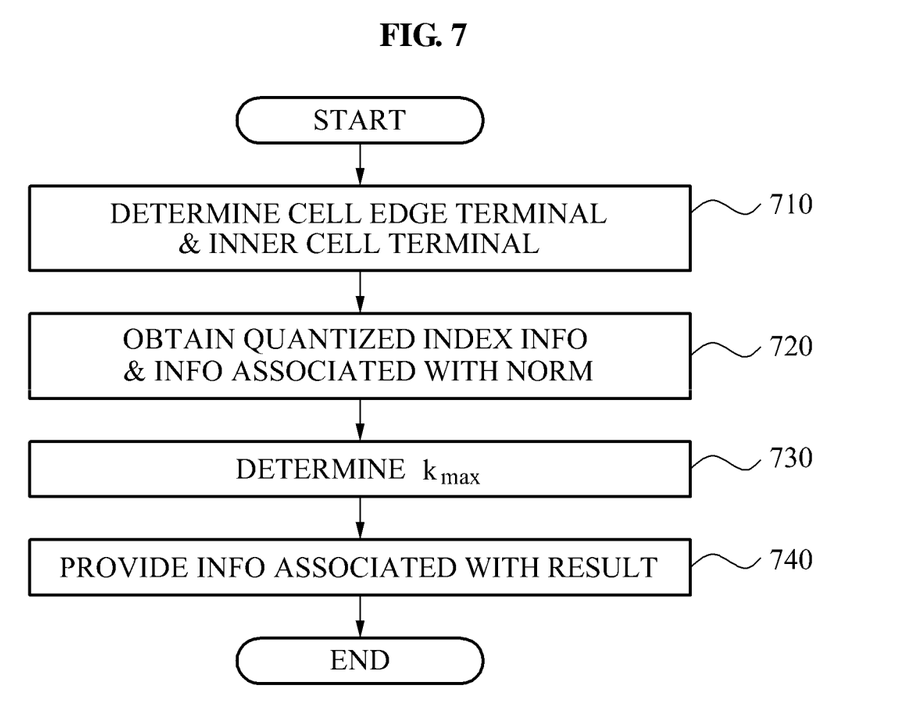
FIG. 7 is a flowchart illustrating an example of a communication method of a control apparatus.

FIG. 7 illustrates an example of a communication method of a control apparatus.

Referring to FIG. 7, in operation 710, the control apparatus may determine cell edge terminals and inner cell terminals from terminals included in each of cells belonging to a cluster.

The control apparatus may determine, from the terminals, the cell edge terminals and the inner cell terminals based on locations of the terminals, a distance between each of the terminals and a corresponding service base station, a magnitude of interference occurring in each of the terminals, and the like.

In operation 720, the control apparatus may obtain, from a base station, quantized index information associated with channels formed in terminals, and information associated with a norm of each of the terminals. For example, each of the terminals may feed back, to at least one of base stations, in particular, a corresponding serving base station, quantized index information associated with each of the channels and information associated with a norm of each of the channels.

In operation 730, the control apparatus may determine an index $k_{max}$ of a base station serving cell edge terminals at a particular point in time, based on a sum rate of the cell edge terminals.

For example, the control apparatus may use feedback information to calculate Equation 6 with respect to k=1, 2, 3, ..., $C_T$. The control apparatus may determine the index $k_{max}$ maximizing Equation 6, as given by Equation 7.

$$k_{max} = \mathrm{argmax}_k R_k^e. \qquad \text{[Equation 7]}$$

In operation 740, the control apparatus may provide, to all the base stations, information associated with the index $k_{max}$ of the determined base station.

During a transmission stage, all the base stations included in all the cells may serve inner cell terminals associated with all the base stations, and only the determined base station may serve cell edge terminals of the determined base station. Cell edge terminals of other base stations may not be served. A transmit power for cell edge terminals not being served may be redistributed to inner cell terminals.

An overall sum rate within a cluster may be expressed by Equation 8.

$$R_{Tot} = R_{k_{max}} + \sum_{\substack{k=1 \\ k \neq k_{max}}}^{C_T} R_k^i. \qquad \text{[Equation 8]}$$

Figure 8:
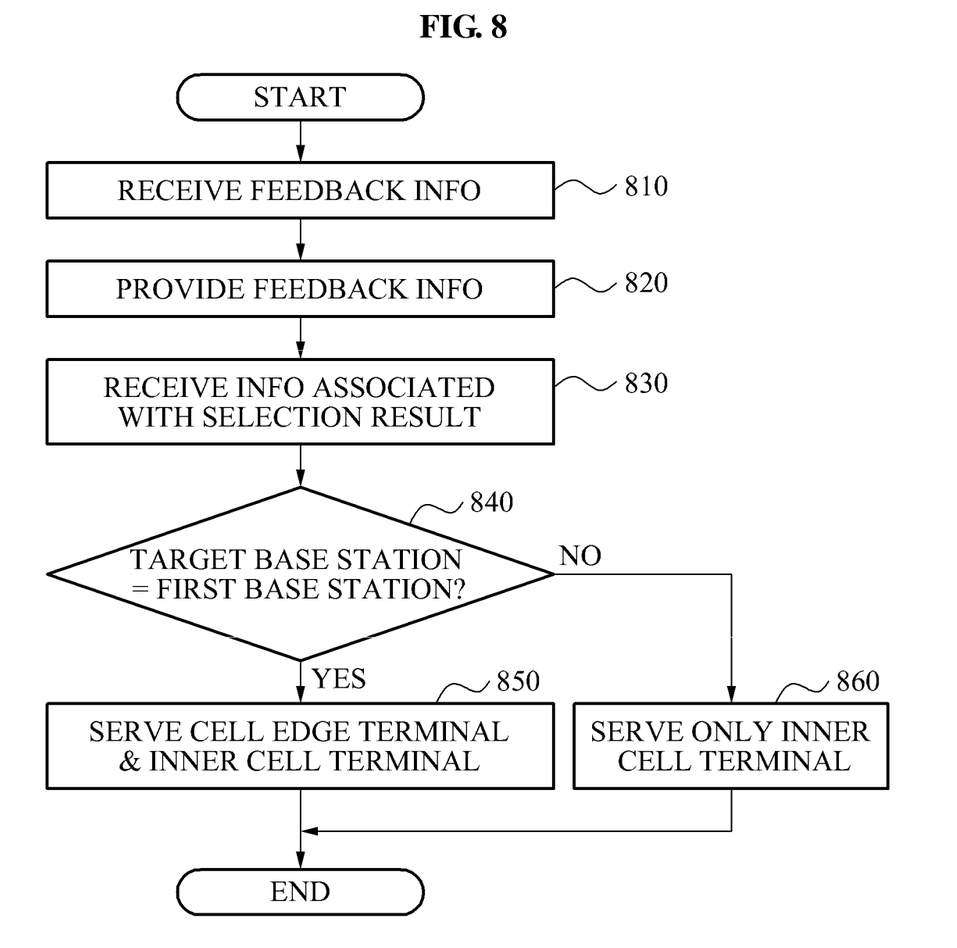
FIG. 8 is a flowchart illustrating an example of a communication method of a target base station.

FIG. 8 illustrates an example of a communication method of a target base station.

Referring to FIG. 8, in operation 810, the target base station may receive feedback information from each of terminals included in a corresponding cell. The feedback information may include quantized index information associated with channels of the terminals and channel quality information. The channels may include channels formed between the target base station and the terminals, and channels formed between neighboring base stations and the terminals.

In operation 820, the target base station may provide feedback information to a control apparatus.

In operation 830, when a calculation is completed by the control apparatus and a base station serving cell edge terminals is selected, the target base station may receive, from the control apparatus, information associated with the selection result.

In operation 840, the target base station may determine whether the target base station is a first base station based on information associated with the selection result. Here, the first base station may indicate the base station serving the cell edge terminals.

In operation 850, when the target base station is the first base station, the target base station may serve all of cell edge terminals and inner cell terminals. For example, the target base station may generate a precoding matrix for serving the cell edge terminals and the inner cell terminals, and may distribute a total transmit power.

Conversely, when the target base station is not the first base station, the target base station may serve only the inner cell terminals in operation 860. Here, the transmit power for the cell edge terminals may be redistributed to the inner cell terminals.

The processes, functions, methods and/or software described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

Figure 9:
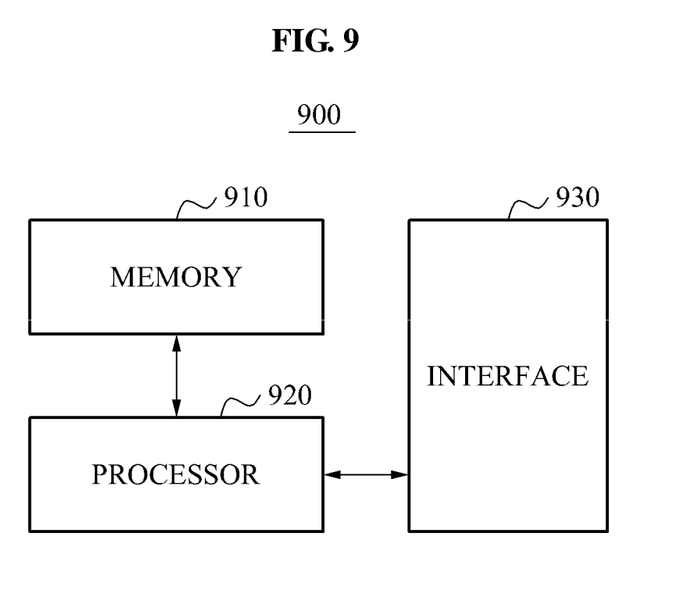
FIG. 9 is a diagram illustrating an example of a control apparatus.

FIG. 9 illustrates an example of a control apparatus 900.

Referring to FIG. 9, the control apparatus 900 may include a memory 910, a processor 920, and an interface 930.

The memory 910 may include identification information and location information associated with base stations included in cells belonging to a cluster, and a codebook used by the base stations.

The processor 920 may determine cell edge terminals or inner cell terminals from terminals, based on locations of terminals included in the cells, a prediction with respect to a magnitude of interference occurring in the terminals, and the like.

The interface 930 may obtain feedback information from each of the base stations. The processor 920 may calculate a sum rate of cell edge terminals in each of the cells, based on the feedback information. A single cell maximizing the sum rate of corresponding cell edge terminals in each of the cells may be selected from the plurality of cells. Only a base station belonging to the selected sell may serve the cell edge terminals, and base stations belonging to unselected cells may serve only corresponding inner cell terminals. The interface 930 may transmit information associated with the selection result to the base stations.

Figure 10:
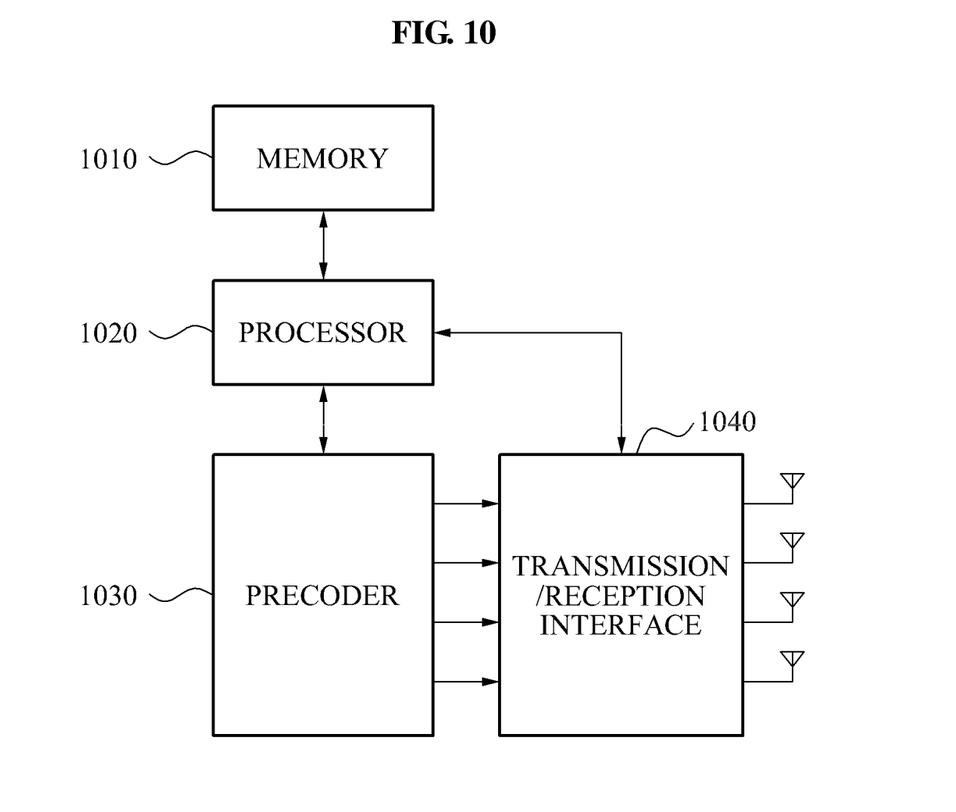
FIG. 10 is a diagram illustrating an example of a base station.

FIG. 10 illustrates an example of a base station.

Referring to FIG. 10, the base station may include a memory 1010, a processor 1020, a precoder 1030, and a transmission and reception interface 1040.

The memory 1010 may include a codebook containing a plurality of codewords. Quantized index information and channel quality information fed back by each of terminals may be received via the transmission and reception interface 1040.

The transmission and reception interface 1040 may provide, to a control apparatus, the quantized index information and the channel quality information. The control apparatus may determine whether the base station may serve cell edge terminals based on the quantized index information and the channel quality information, and may inform the decision result.

When the base station may serve the cell edge terminals, the processor 1020 may generate a precoding matrix for all of the cell edge terminals and inner cell terminals, based on the quantized index information and the channel quality information. The processor 1020 may distribute a total power to the cell edge terminals and the inner cell terminals.

The precoder 1030 may transmit, to the cell edge terminals and the inner cell terminals via a plurality of antennas, data streams that are precoded using the generated precoding matrix.

When the base station may not serve the cell edge terminal, the processor 1020 may generate the precoding matrix for only the inner cell terminals, based on the quantized index information and the channel quality information. The processor 1020 may distribute a total power to the inner cell terminals. The precoder 1030 may transmit the precoded data streams to the inner cell terminals using the plurality of antennas.

Descriptions made above with reference to FIG. 1 through FIG. 8 may be applicable as is to the control apparatus 900 of FIG. 9 and the base station of FIG. 10 and thus, further detailed description will be omitted here.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A control method of a control apparatus for a multi-cell communication system comprising a plurality of cells, the method comprising:
   determining, for each cell among the plurality of cells, one or more cell edge terminals and one or more inner cell terminals from among terminals included in each respective cell;
   selecting a first base station corresponding to a first cell from among the plurality of cells and a second base station corresponding to a second cell from among the plurality of cells, the first base station being selected to serve cell edge terminals and inner cell terminals included in the first cell, and the second base station being selected to serve only inner cell terminals included in the second cell; and
   obtaining, from each of the terminals comprised in each of the cells, quantized index information with respect to each of channels to the base stations and information associated with a norm of each of the channels,
   wherein the selecting comprises selecting the first base station and the second base station based on the quantized index information and information associated with the norm of each of the channels.

2. The method of claim 1, further comprising:
   calculating a sum rate of cell edge terminals in each of the cells,
   wherein the selecting comprises selecting the first base station and the second base station in each of the cells, based on the sum rate.

3. The method of claim 1, further comprising:
   selecting one cell from the plurality of cells maximizing a sum rate of corresponding cell edge terminals in each of the cells,
   wherein the selecting comprises selecting, as the first base station, a base station comprised in the selected cell, and selecting, as the second base station, a base station comprised in at least one remaining cell.

4. The method of claim 1, wherein the determining comprises determining the one or more cell edge terminals and the one or more inner cell terminals based on a distance between each of the terminals comprised in each of the cells and a corresponding serving base station, or a distance between each of the terminals comprised in each of the cells and a corresponding interference base station.

5. The method of claim 1, wherein the determining comprises determining the one or more cell edge terminals and the one or more inner cell terminals based on a strength of interference occurring in each of the terminals comprised in each of the cells or channel quality information in each of the terminals.

6. The method of claim 1, further comprising:
   providing information associated with the selection result to the base stations comprised in the plurality of cells.

7. A non-transitory computer-readable medium comprising a program for instructing a computer to perform the method of claim 1.

8. The method of claim 1, wherein each of the inner cell terminals served by the second base station are within a predetermined distance from the second base station, and each of the cell edge terminals not served by the second base station, but which are included in the second cell, are located at least the predetermined distance away from the second base station.

9. A communication method of a target base station comprised in one target cell among a plurality of cells comprised in a multi-cell communication system, the method comprising:

provolving, to a control apparatus of the multi-cell communication system, quantized index information associated with channels between the target base station and each terminal included in the target cell, and information associated with a norm of each of the channels;

receiving a selection from the control apparatus, the selection comprising a first base station corresponding to a first cell among the plurality of cells and a second base station corresponding to a second cell from among the plurality of cells, the first base station being selected to serve cell edge terminals and inner cell terminals included in the first cell, and the second base station being selected to serve only inner cell terminals included in the second cell; and serving at least one of a cell edge terminal and an inner cell terminal included in the target cell based on the selection by the control apparatus.

* * * * *